United States Patent [19]

Hasegawa et al.

[11] Patent Number: 4,657,413
[45] Date of Patent: Apr. 14, 1987

[54] BEARING DEVICE

[75] Inventors: Junzo Hasegawa; Susumu Kawabata; Nobuharu Mimura, all of Aichi, Japan

[73] Assignee: Kabushiki Kaisha Toyota Chuo Kenkyusho, Aichi, Japan

[21] Appl. No.: 745,251

[22] Filed: Jun. 13, 1985

[30] Foreign Application Priority Data

Jun. 21, 1984 [JP] Japan .............................. 59-128803

[51] Int. Cl.⁴ ............................................ F16C 33/38
[52] U.S. Cl. .................................................. 384/524
[58] Field of Search ............... 384/524, 523, 572, 513, 384/569

[56] References Cited

U.S. PATENT DOCUMENTS

| | | | |
|---|---|---|---|
| 1,266,146 | 5/1918 | Newmann | 384/524 |
| 1,543,320 | 6/1925 | Cofrancesco et al. | 384/523 |
| 3,913,993 | 10/1975 | Ernst | 384/523 |

*Primary Examiner*—Lenard A. Footland
*Attorney, Agent, or Firm*—Mason, Fenwick & Lawrence

[57] ABSTRACT

A bearing device for high-speed rotary machines comprises a first rolling-element bearing having a retainer for holding constant spacing of rolling elements inserted between an inner race and an outer race thereof and also a second bearing for supporting the retainer of the first rolling-element bearing, thereby the retainer of the first rolling-element bearing is prevented from contacting with the inner race or the outer race.

15 Claims, 9 Drawing Figures

BEARING DEVICE

BACKGROUND OF THE INVENTION

The present invention relates to a bearing device to be used in a rotor type open end fine spinning machine or other high-speed rotary machines.

In a rotor type open end fine spinning machine in the prior art, a spinning rotor is rotated at a high speed greater thaan 40,000 r.p.m., since productivity of yarn is proportional to the revolution speed of the spinning rotor. A rotation shaft of the spinning rotor is supported by a ball bearing. A rolling-element bearing such as a ball bearing is provided with a plurality of rolling elements inserted between an inner race and an outer race to form a raceway and a retainer to hold constant spacing between the rolling elements.

If the revolution speed of the spinning rotor is increased to about 90,000 r.p.m., however, the rolling-element bearing may be damaged because of seizure or galling at the retainer. Since it is quite difficult that the rolling-element bearing in the prior art is rotated at a high speed more than 90,000 r.p.m., such a bearing cannot be said to be excellent in high-speed rotation performance.

SUMMARY OF THE INVENTION

In order to eliminate above-mentioned disadvantages in the prior art, an object of the invention is to provide a bearing device which is excellent in high-speed rotation performance.

In order to attain above object, the inventors have investigated causes of seizure or galling at the retainer in the rolling-element bearing of the prior art. The retainer is rotated while it holds spacing of rolling elements such as balls or rollers inserted between the inner race and the outer race. However, it becomes clear as a result of our investigation that the retainer is always slided at a part of its inner circumferential edge or outer circumferential edge with the inner race or the outer race and rotated in eccentric rotation and that, when the retainer is rotated at a high speed, an oil film formed on the sliding portion may be broken and the seizure or galling may be produced. Accordingly, cause of the seizure or galling of the retainer is contacting of the retainer with the inner race or the outer race.

On the basis of the result of the investigation, the inventors have thought of a bearing device 1 as shown in FIG. 1 through FIG. 3, where in order to prevent a retainer 6 of a rolling-element bearing 2 from contacting with an inner race 3 or an outer race 4, the retainer 6 of the rolling-element bearing 2 is supported by a second bearing 8.

In the bearing device 1, since the retainer 6 of the first rolling-element bearing 2 is supported by the second bearing 8 and prevented from contacting with the inner race 3 or the outer race 4, the retainer 6 does not seize. If the second bearing 8 is a rolling-element bearing, however, since a retainer 12 of the second rolling-element bearing 8 is not prevented from contacting with an inner race 9 or an outer race 10, there still remains question that the retainer 12 may be apt to seize.

In order to answer the question, in the first and the second rolling-element bearings 2, 8 of the bearing device 1 shown in FIG. 1 through FIG. 3, relative revolution speed of the retainers 6, 12 to the inner races 3, 9 has been estimated.

In the first rolling-element bearing 2, i.e. planetary friction wheel mechanism, let $d_1$ and $D_1$ represent outer diameter of the inner race 3 and inner diameter of the outer race 4, respectively, as shown in FIG. 2. Then relation between revolution speed $N_1$ of the inner race 3 and revolution speed $n_1$ of the retainer 6 becomes as follows:

$$n_1 = \frac{N_1}{1 + D_1/d_1} \tag{1}$$

Also regarding the second rolling-element bearing 8, let $d_2$ and $D_2$ represent outer diameter of the inner race 9 and inner diameter of the outer race 10, respectively, as shown in FIG. 3. Then relation between revolution speed $N_2$ of the inner race 9 and revolution speed $n_2$ of the retainer 12 becomes as follows:

$$n_2 = \frac{N_2}{1 + D_2/d_2} \tag{2}$$

Since revolution speed $n_1$ of the retainer 6 of the first rolling-element bearing is equal to revolution speed $N_2$ of the inner race 9 of the second rolling-element bearing device 1, it follows that $$n_1 = N_2 \tag{3}$$

By substituting formulae (3) and (1) into formula (2) and eliminating $N_2$, it follows that $$n_2 = \frac{n_1}{1 + D_2/d_2} = \frac{N_1}{(1 + D_2/d_2)(1 + D_1/d_1)} \tag{4}$$

Difference between revolution speed $N_1$ of the inner race 3 and revolution speed $n_1$ of the retainer 6 in the first rolling-element bearing 2, i.e. relative revolution speed $\Delta n_1$ becomes by using formula (1)

$$\Delta n_1 = N_1 - n_1 = N_1 - \frac{N_1}{1 + D_1/d_1} \tag{5}$$

$$= \frac{D_1/d_1}{1 + D_1/d_1} \cdot N_1$$

Also difference between revolution speed $N_2$ of the inner race 9 and revolution speed $n_2$ of the retainer 12 in the second rolling-element bearing 8, i.e. relative revolution speed $\Delta n_2$ becomes by using formulae (1), (3) and (4)

$$\Delta n_2 = N_2 - n_2 = \frac{N_1}{1 + D_1/d_1} - \frac{N_1}{(1 + D_2/d_2)(1 + D_1/d_1)} \tag{6}$$

$$= \frac{D_2/d_2}{(1 + D_2/d_2)(1 + D_1/d_1)} \cdot N_1$$

Ratio of both relative revolution speeds $\Delta n_1$, $\Delta n_2$ becomes by using formulae (5) and (6)

$$\frac{\Delta n_2}{\Delta n_1} = \frac{D_2/d_2}{(D_1/d_1)(1 + D_2/d_2)} \tag{7}$$

For simplification, assuming that the first and the second rolling-element bearings 2, 8 are similar figures, it follows that $$\frac{D_1}{d_1} = \frac{D_2}{d_2} > 1 \tag{8}$$

Substituting formula (8) into formula (7), it follows that $$\frac{\Delta n_2}{\Delta n_1} < \frac{1}{2} \tag{9}$$

It is clear from formula (9) that the relative revolutiion speed $\Delta n_2$ between the retainer 12 and the inner race 9 in the second rolling-element bearing 8 is less than a half of the relative revolution speed $\Delta n_1$ in the first rolling-element bearing 2. Consequently, even if the retainer 12 of the second rolling-element bearing 8 contacts with the inner race 9, the relative speed or the sliding speed between these is small and therefore the seizure is scarcely produced.

Although above description or discussion relates to contacting state of the retainer with the inner race, similar effect or result applies also to contacting state with the outer race.

Next, in order to confirm the high-speed rotation performance of the bearing device 1 of the invention shown in FIG. 1 through FIG. 3 from the experimental viewpoint, in the bearing device 1 of the invention composed of the first and the second rolling-element bearings 2, 8 and that of the prior art composed of only the first rolling-element bearing 2, a rotation shaft 27 fitted to the inner race 3 of the first rolling-element bearing was rotated in various revolution speeds and temperature at the outer race 4 of the first rolling-element bearing was measured at each revolution speed. Diagram of FIG. 4 shows the measuring results regarding the bearing device of the prior art by broken line with triangular marks and regarding that of the invention by solid line with circular marks respectively. It is clear from the diagram that the temperature T of the outer race of the bearing in the prior art becomes high and when the revolution speed $N_1$ becomes about 90,000 r.p.m. the temperature T rises rapidly resulting in seizure of the retainer. On the contrary, in the bearing device of the invention, the temperature T of the outer race of the bearing is low and even if the revolution speed becomes 100,000 r.p.m. seizure of the retainer is not produced and the device is rotated smoothly.

Accordingly, in the bearing device of the present invention as clearly understood from above description, besides the first rolling-element bearing having the retainer to hold constant spacing of a plurality of rolling elements inserted between the inner race and the outer race, the second bearing is installed to support the retainer of the first rolling-element bearing so that the retainer of the first rolling-element bearing is prevented from contacting with the inner race or the outer race.

This bearing device is excellent in high-speed rotation performance.

DETAILED DESCRIPTION OF THE PREFERRED EMBODIMENTS

First Embodiment (refer to FIGS. 1-3 and FIG. 5)

Figure 1:
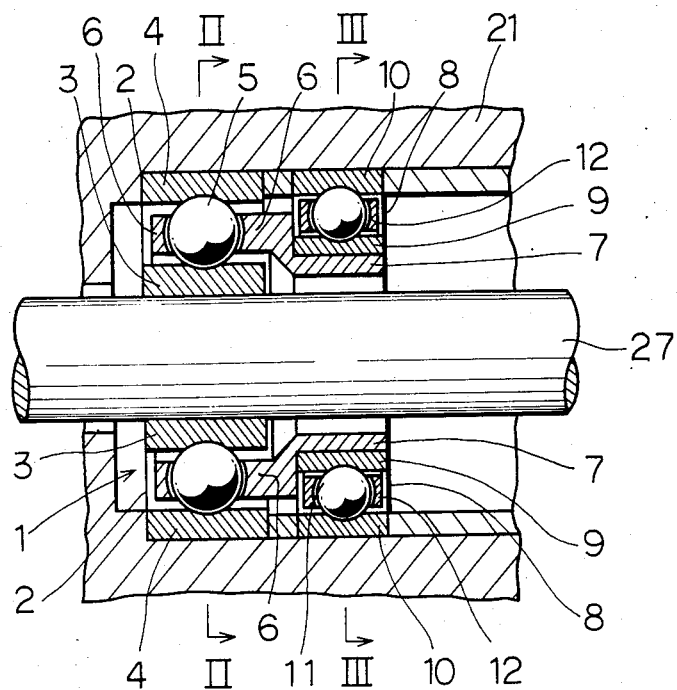
FIG. 1 is a longitudinal side sectional view of a bearing device as a first embodiment of the invention.
Figure 2:
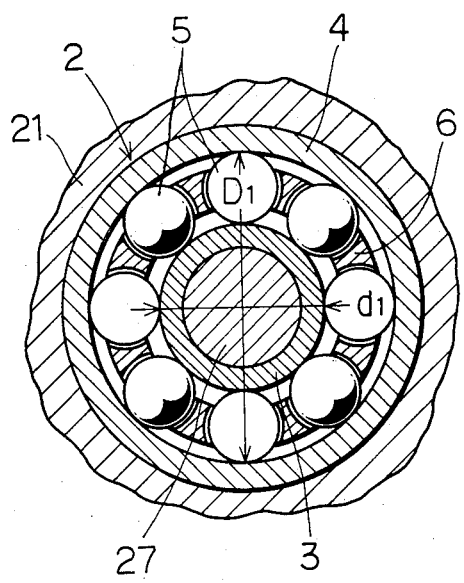
FIG. 2 is a sectional view taken in line II—II of FIG. 1.
Figure 3:
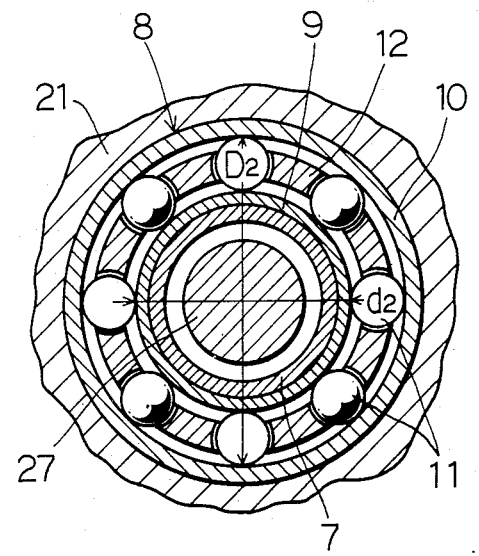
FIG. 3 is a sectional view taken in line III—III of FIG. 1.
Figure 4:
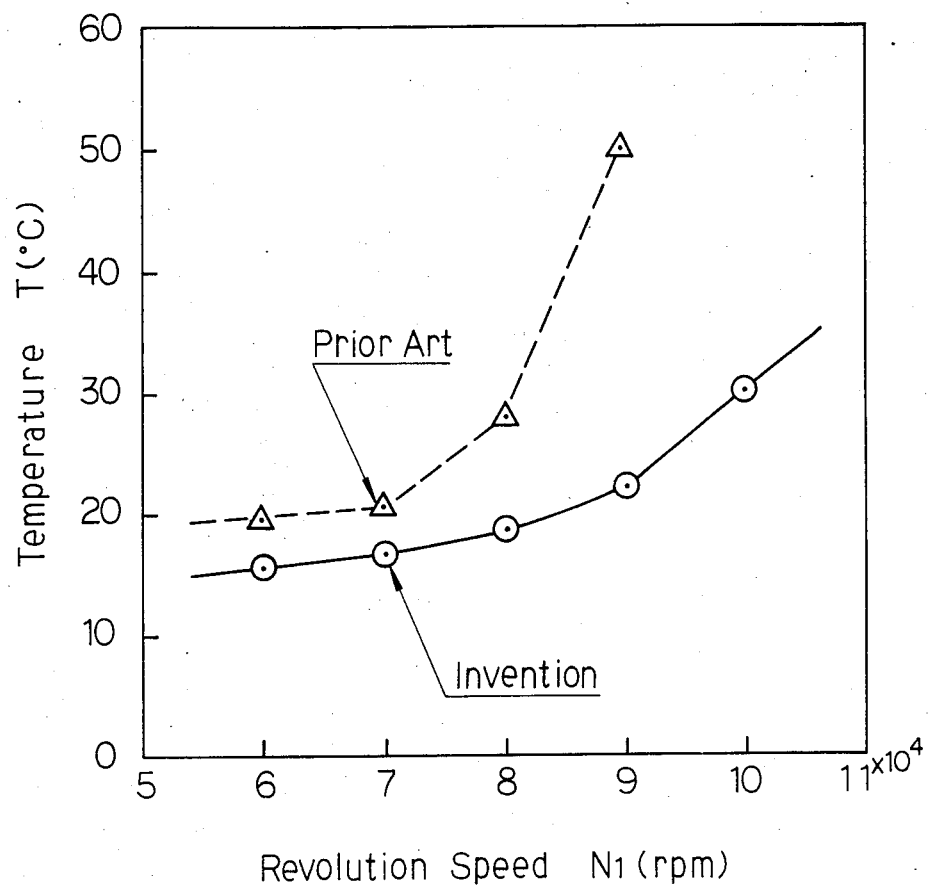
FIG. 4 is a diagram showing relation between outer race temperature of a first rolling-element bearing and revolution speed in the bearing device of the first embodiment and that of the prior art.
Figure 5:
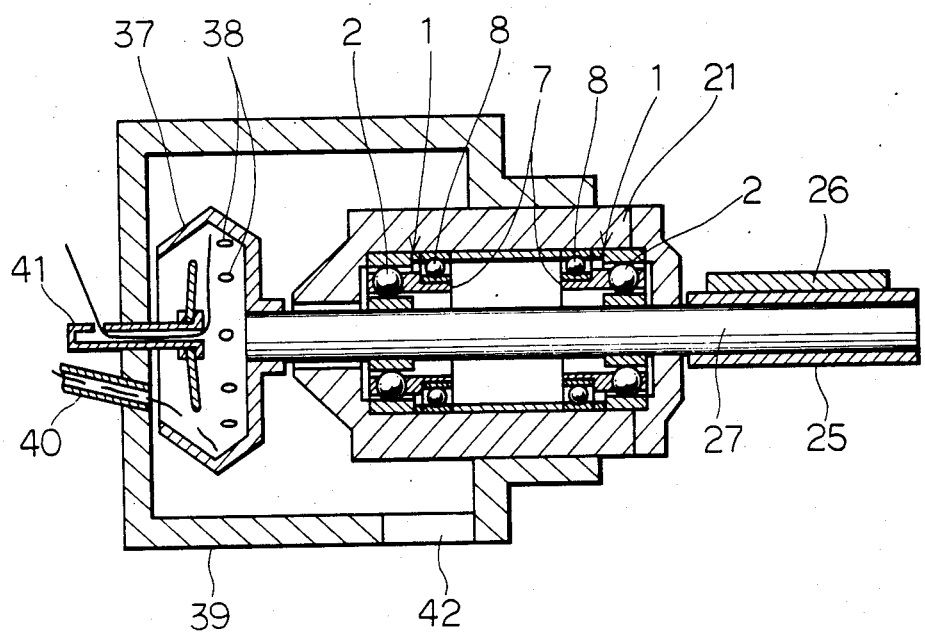
FIG. 5 is a longitudinal side sectional view of a rotor type open end fine spinning machine with the bearing device of the first embodiment.

A rotor type open end fine spinning machine with a bearing device of this embodiment as shown in FIG. 5 comprises a cylindrical casing 21, and a rotation shaft 27 inserted in the casing 21 at the axial center position. The rotation shaft 27 in the casing 21 is supported at front and rear sides to the casing 21 through bearing device 1, respectively. Both bearing devices 1, 1 at the front side and the rear side are constituted in similar manner. Referring to FIG. 1 through FIG. 3, a first ball bearing 2 is fitted between the casing 21 and the rotation shaft 27 so as to support the rotation shaft 27, and a plurality of rolling elements being balls 5 are inserted between an inner race 3 and an outer race 4 of the first ball bearing 2 and spacing of the balls 5 is held constant by a retainer 6. A support ring 7 projecting rearwards or forwards between the inner race 3 and the outer race 4 is connected to the retainer 6, and a second ball bearing 8 is fitted between the support ring 7 projecting from the retainer 6 of the first ball bearing 2 and the casing 21, thereby the retainer 6 of the first ball bearing 2 is supported through the second ball bearing 8 and prevented from contacting with the inner race 3 or the outer race 4.

The second ball bearing 8 is ordinary one where a plurality of rolling elements being balls 11 are inserted between an inner race 9 and an outer race 10, and spacing of the balls 11 is held constant by a retainer 12.

As shown in FIG. 5, a pulley 25 is fitted to rear end portion of the rotation shaft 27 projecting from the rear end of the casing 21, and a belt 26 connected to a motor (not shown) is stretched to the pulley 25 so that the rotation shaft 27 is rotated at a high speed. A spinning rotor 37 of cup-like shape is fitted to front end portion of the rotation shaft 27 projecting from the front end of the casing 21, and a plurality of air exhaust holes 38 are bored on a circumferential wall of the spinning rotor 37. A cover 39 in cylindrical container form to surround the spinning rotor 37 encloses front portion of the casing 21. An end plate at top end of the cover 39 faces to an opening of the spinning rotor 37, and an opening at base end of the cover 39 is fitted to the casing 21. A fiber feed tube 40 penetrates the end plate of the cover 39 and faces to peripheral portion of the opening of the spinning rotor 37. A yarn taking tube 41 penetrates the end plate of the cover 39 and faces to center portion of the opening of the spinning rotor 37, and exhaust port 42 penetrates the circumferential wall of the cover 39 at base end side.

When the spinning rotor 37 is rotated, air flow is generated and passes through the fiber feed tube 40 and the inside of the spinning rotor 37 from the opening to the air exhaust holes 38 thereof. The air flow further passes through the inside of the cover 39 and is taken out of the exhaust port 42, and the air flow passing through the inside of the cover 39 eliminates the friction heat produced during rotation of the spinning rotor 37.

When the rotor type open end fine spinning machine with a bearing device of this embodiment is operated, the rotation shaft 27 is rotated at a high speed in similar manner to the prior art thereby the spinning rotor 37 is rotated at a high speed. Then, however, difference from the prior art lies in that since the retainer 6 of the first ball bearing is not slided with the inner race 3 or the outer race 4 in both bearing devices 1, 1, the rotation shaft 27 is rotated smoothly at a high speed without producing large vibration or noise, and the friction heat is not produced between the retainer 6 and the inner race 3 or the outer race 4 of the first ball bearing thereby the retainer 6 of the first ball bearing does not seize.

Figure 6:
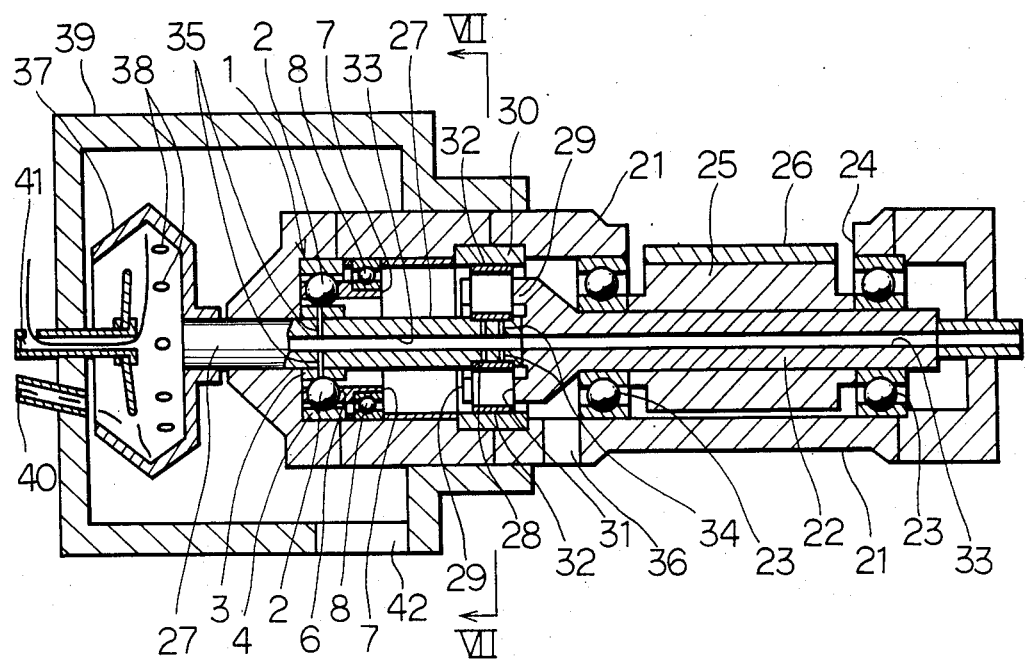
FIG. 6 is a longitudinal side sectional view of a rotor type open end fine spinning machine with a bearing device of a second embodiment.
Figure 7:
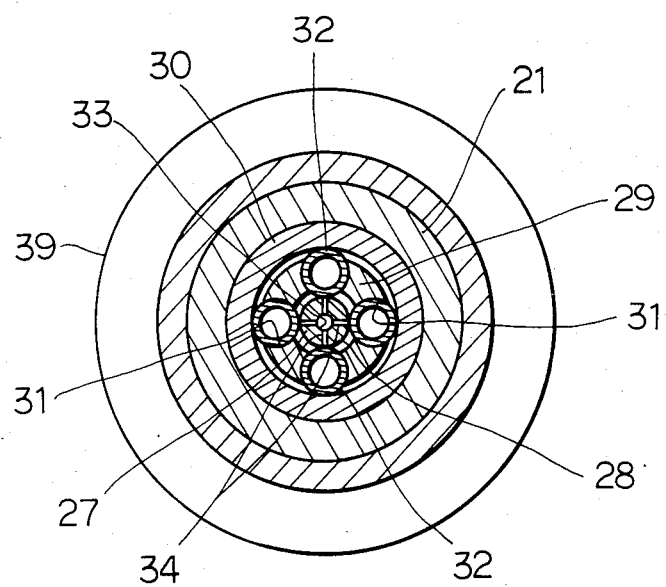
FIG. 7 is a sectional view taken in line VII—VII of FIG. 6.

Second Embodiment (refer to FIGS. 6 and 7)

A rotor type open end fine spinning machine with a bearing device of this embodiment as shown in FIG. 6 comprises a cylindrical casing 21, and a drive shaft 22 installed in rear part of the casing 21 at the axial center position. The drive shaft 22 is supported at both ends through ball bearings 23, respectively. A pulley 25 fitted to center portion of the drive shaft 22 faces a window 24 on a circumferential wall of the casing 21. A belt 26 connected to a motor (not shown) is stretched to the pulley 25 so as to rotate the drive shaft 22. A rotation shaft 27 is installed in front part of the casing 21 as shown in FIG. 6. A top end portion of the rotation shaft 27 is penetrated to a top end plate of the casing 21 and a center portion of the rotation shaft 27 is supported through a bearing device 1, thereby the rotation shaft 27 is rotatably supported at front side of the drive shaft 22 coaxially thereto. The bearing device 1 is constituted in similar manner to that of the first embodiment. A first ball bearing 2 is fitted between the casing 21 and the rotation shaft 27 so as to support the rotation shaft 27, and a support ring 7 projecting rearwards between an inner race 3 and an outer race 4 is connected to a retainer 6 of the first bearing 2. A second ball bearing 8 is fitted between the support ring 7 and the casing 21, thereby the retainer 6 of the first ball bearing 2 is supported through the second ball bearing 8 and prevented from contacting with the inner race 3 or the outer race 4.

As clearly seen in FIG. 6 and FIG. 7, a groove 28 is formed on outer circumferential surface of base end portion of the rotation shaft 27, a carriage ring 29 connected to top end portion of the drive shaft 22 is arranged on outside of the groove 28 of the rotation shaft, a stationary ring 30 is fitted to inside of the casing 21 at outside of the carriage ring 29 of the drive shaft, planetary friction wheels 32 each being a cylindrical rotor are slidably fitted to recesses 31 which are arranged at regular intervals to the carriage ring 29 of the drive shaft along the axial direction, the planetary friction wheels 32 each having diameter larger than thickness of the carriage ring 29 are fitted between circumferential surface of the stationary ring 30 and the groove 28 of the rotation shaft under suitable pressure, and when the drive shaft 22 is rotated the planetary friction wheels 32 are rotated around the rotation shaft 27 and at the same time each wheel 32 is rotated on its own axis thereby the rotation shaft 27 is rotated at multiplied speed, that is, the bearing mechanism together with speed multiplying mechanism being the planetary friction wheel mechanism is constituted.

The drive shaft 22 and the rotation shaft 27 arranged coaxially, as shown in FIG. 6 and FIG. 7, are provided with an oil feed passage 33 at the axial center. Plurality of oil feed passages 34 extending from the oil feed passage 33 to the groove 28 of the planetary friction wheel mechanism and also plurality of oil feed passages 35 extending from the oil feed passage 33 to inside of the inner race 3 of the first ball bearing of the bearing device are provided. Lubrication oil is supplied from an oil feed source (not shown) to the oil feed passage 33 of the drive shaft, and further fed through the oil feed passages 34 to the planetary friction wheel mechanism 28, 29, 30, 31, 32 and through the oil feed passages 35 to the first ball bearing 2 of the bearing device respectively. And then lubrication oil flows therefrom and is returned through an oil exhaust hole 36 on circumferential wall of the casing 21 to the oil feed source.

Since this embodiment is similar to the first embodiment except for the above-mentioned constitution, like parts in FIG. 6 and FIG. 7 are designated respectively by the same reference numerals and the description shall be omitted.

When the rotor type open end fine spinning machine with a bearing device of this embodiment is operated, lubrication oil is supplied to the oil feed passage 33 in similar manner to the prior art and the drive shaft 22 is rotated thereby the rotation shaft 27 hence the spinning rotor 37 is rotated at a multiplied speed. Then, however, difference from the prior art lies in that since the retainer 6 of the first ball bearing is not slided with the inner race 3 or the outer race 4 in the bearing device 1, large vibration or noise is not produced and the friction heat is little and the retainer 6 of the first ball bearing does not seize.

Figure 8:
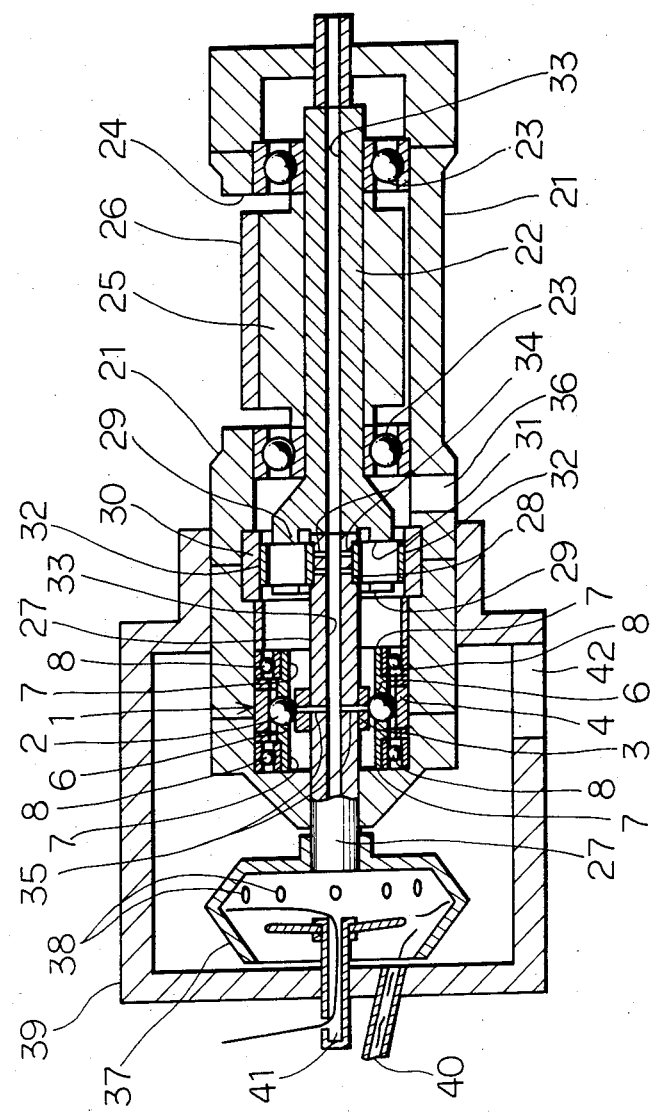
FIG. 8 is a longitudinal side sectional view of a rotor type open end fine spinning machine with a bearing device of a third embodiment.

Third Embodiment (refer to FIG. 8)

A rotor type open end fine spinning machine with a bearing device of this embodiment as shown in FIG. 8 is slightly different from the previous embodiment in a bearing device 1 through which a rotation shaft 27 is supported to a casing 21. The bearing device 1 of this embodiment is constituted in that a first ball bearing 2 is fitted between the casing 21 and the rotation shaft 27 so as to support the rotation shaft 27, support rings 7, 7 projecting rearwards and forwards between an inner race 3 and an outer race 4 are connected respectively to the rear end and the front end of a retainer 6 of the first ball bearing 2, second ball bearings 8, 8 are fitted between both front and rear support rings 7, 7 and the casing 21 respectively, and the retainer 6 of the first ball bearing 2 is supported through both second ball bearings 8, 8 at front and rear sides thereby prevented from contacting with the inner race 3 or the outer race 4.

In the bearing device 1 of this embodiment, since the retainer 6 of the first ball bearing is supported at both front and rear sides, the retainer 6 can be rotated more smoothly and the rotation shaft 27 be rotated at a higher speed.

Since this embodiment is similar to the previous embodiment except for the above-mentioned constitution, like parts in FIG. 8 are designated respectively by the

Figure 9:
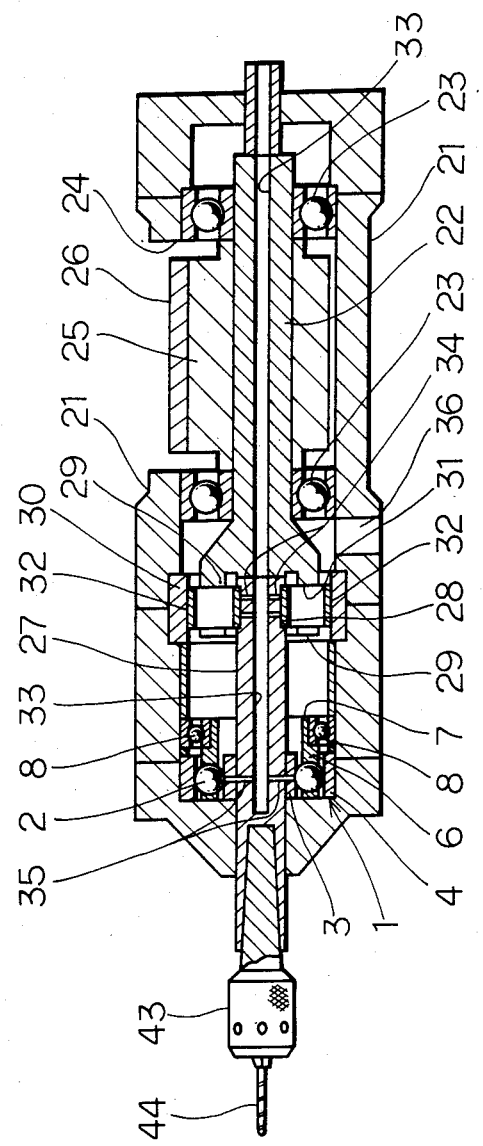
FIG. 9 is a longitudinal side sectional view of a tool rotating device with a bearing device of a fourth embodiment.

Fourth Embodiment (refer to FIG. 9)

This embodiment relates to modification of the rotor type open end fine spinning machine of the second embodiment as shown in FIG. 6 and FIG. 7 into a tool rotating device. In the tool rotating device of this embodiment, the cover 39, the fiber feed tube 40, the yarn taking tube 41 and the spinning rotor 37 in the rotor type open end fine spinning machine of the second embodiment are removed, and a tool holder 43 such as a chuck is connected to top end of a rotation shaft 27 and a rotary tool such as a drill is attached to the tool holder 43 as shown in FIG. 9.

In the bearing device 1 through which the rotation shaft 27 is supported to the casing 21, since the retainer 6 of the first ball bearing 2 is not slided with the inner race 3 or the outer race 4 in similar manner to the second embodiment, the bearing device 1 is excellent in high-speed rotation performance and the rotary tool 44 can be rotated at a higher speed and the machining efficiency be improved. Furthermore, since the friction heat produced from the bearing device 1 is little, the thermal deformation of the tool rotating device is little and the machining accuracy is high.

Since this embodiment is similar to the second embodiment except for the above-mentioned constitution, like parts in FIG. 9 are designated respectively by the same reference numerals and the description shall be omitted.

Other Embodiment

This embodiment relates to a speed multiplying device where the drive shaft 22 in the tool rotating device of the fourth embodiment is made an input shaft and the rotation shaft 27 is made an output shaft. This embodiment also relates to a speed reducing device by changing the input shaft and the output shaft.

What we claim is:
1. A bearing device comprising:
   a first rolling-element bearing comprising an inner race, an outer race, a plurality of spaced-apart rolling elements inserted between the inner and outer races, and a retainer having first and second ends for holding constant the spacing of the rolling elements; and
   a second rolling-element bearing having inner and outer races, the retainer of the first rolling-element bearing being connected to one of the races of the second rolling-element bearing and being supported by the second rolling-element bearing, whereby the second rolling-element bearing prevents the retainer of the first rolling-element bearing from contacting the inner race or the outer race of the first rolling-element bearing.
2. A bearing device as set forth in claim 1, wherein a support ring is connected to one end of the retainer of the first rolling-element bearing, and the second rolling-element bearing is fitted to the support ring.
3. A bearing device as set forth in claim 2, wherein said second rolling-element bearing includes a plurality of spaced-apart rolling elements inserted between the inner race and the outer race and a retainer for holding constant the spacing of the rolling elements.
4. A bearing device as set forth in claim 2, wherein said first rolling-element bearing comprises a ball bearing and the rolling-elements comprise balls.
5. A bearing device as set forth in claim 4, wherein said second rolling-element bearing includes a plurality of spaced-apart rolling elements inserted between the inner race and the outer race and a retainer for holding constant the spacing of the rolling elements.
6. A bearing device as set forth in claim 5, wherein said second rolling-element bearing comprises a ball bearing and the rolling elements comprise balls.
7. A bearing device as set forth in claim 1, wherein support rings are connected respectively to both ends of the retainer of the first rolling-element bearing, second bearings are fitted to both support rings respectively, and the retainer of the first rolling-element bearing is supported at both sides.
8. A bearing device as set forth in claim 7, wherein said first rolling-element bearing comprises a ball bearing and the rolling-elements comprise balls.
9. A bearing device as set forth in claim 8, wherein said second rolling-element bearing includes a plurality of spaced-apart rolling elements inserted between the inner race and the outer race and a retainer for holding constant the spacing of the rolling elements.
10. A bearing device as set forth in claim 9, wherein said second rolling-element bearing comprises a ball bearing and the rolling elements comprise balls.
11. A bearing device as set forth in claim 7, wherein said second rolling-element bearing includes a plurality of spaced-apart rolling elements inserted between the inner race and the outer race and a retainer for holding constant the spacing of the rolling elements.
12. A bearing device as set forth in claim 1, wherein said first rolling-element bearing comprises a ball bearing and the rolling-elements comprise balls.
13. A bearing device as set forth in claim 12, wherein said second rolling-element bearing includes a plurality of spaced-apart rolling elements inserted between the inner race and the outer race and a retainer for holding constant the spacing of the rolling elements.
14. A bearing device as set forth in claim 13, wherein said second rolling-element bearing comprises a ball bearing and the rolling elements comprise balls.
15. A bearing device as set forth in claim 1, wherein said second rolling-element bearing includes a plurality of spaced-apart rolling-elements inserted between the inner race and the outer race and a retainer for holding constant the spacing of the rolling elements.

* * * * *